(12) United States Patent
Morris

(10) Patent No.: US 11,615,661 B2
(45) Date of Patent: Mar. 28, 2023

(54) SYSTEM AND METHOD FOR PROVIDING RESTRICTED ACCESS TO STORAGE COMPARTMENTS

(71) Applicant: Richard Joseph Morris, Discovery Bay, CA (US)

(72) Inventor: Richard Joseph Morris, Discovery Bay, CA (US)

(*) Notice: Subject to any disclaimer, the term of this patent is extended or adjusted under 35 U.S.C. 154(b) by 51 days.

(21) Appl. No.: 17/016,982

(22) Filed: Sep. 10, 2020

(65) Prior Publication Data
US 2022/0076510 A1 Mar. 10, 2022

(51) Int. Cl.
*G07C 9/00* (2020.01)
*G06F 21/32* (2013.01)

(52) U.S. Cl.
CPC ......... *G07C 9/00563* (2013.01); *G06F 21/32* (2013.01)

(58) Field of Classification Search
CPC .............................. G07C 9/00563; G06F 21/32
See application file for complete search history.

(56) References Cited

U.S. PATENT DOCUMENTS

| | | | | |
|---|---|---|---|---|
| 5,744,876 A | * | 4/1998 | Fangio | H02J 9/061 307/66 |
| 2010/0326145 A1 | * | 12/2010 | Powers | E05B 39/005 70/158 |
| 2014/0046482 A1 | * | 2/2014 | Michael | A47B 88/40 700/236 |
| 2014/0208813 A1 | * | 7/2014 | Reeb | B65F 1/1646 70/277 |
| 2015/0179006 A1 | * | 6/2015 | Von Zurmuehlen | G07F 17/12 340/5.54 |
| 2020/0250614 A1 | * | 8/2020 | Zhu | G06Q 10/0836 |
| 2021/0035063 A1 | * | 2/2021 | Cartwright | G07F 9/105 |

OTHER PUBLICATIONS

Tschler, Lee; "Designing with reed switches: What you need to know;" Monolithic Power Systems (MPS); pp. 1-5 (Year: 2019).*

* cited by examiner

*Primary Examiner* — Nabil H Syed
*Assistant Examiner* — Cal J Eustaquio
(74) *Attorney, Agent, or Firm* — West & Associates, A PC; Stuart J. West

(57) ABSTRACT

A restricted access locking system for storage furniture. The system comprises one or more processors and one or more computer-readable non-transitory memory coupled to one or more of the processors, the one or more computer-readable non-transitory memory including instructions operable when executed by one or more of the processors to sense, via a first sensor that is communicatively coupled to the processor, an input biometric security credential to generate a first signal based on whether the input biometric security credential maps with a key biometric security credential pre-configured and stored within the memory; and generate a second signal via the processor subsequent to the reception of the first signal by the processor for actuating at least one lock, mounted on one or more storage compartments of the storage furniture, to an open position, wherein the at least one lock is communicatively coupled to the processor.

18 Claims, 9 Drawing Sheets

SYSTEM AND METHOD FOR PROVIDING RESTRICTED ACCESS TO STORAGE COMPARTMENTS

FIELD

Exemplary embodiment(s) of the present disclosure relate to locking kit and, more particularly, to locking kit, system, and method for providing restricted access to one or more storage compartments of storage furniture.

BACKGROUND

Storage furniture are known in the art. Storage furniture includes all those kinds of furniture that are used for storing different kinds of items. Some examples of storage furniture include closets, file cabinets, bookshelves, pantries, kitchen cabinets, and the like. Storage furniture typically include storage compartments in the form of inner shelves, drawers, and the like. In office spaces, the provision of restricted access to aforementioned types of storage furniture is typically provided using a conventional lock and key arrangement. Typically, the key is on the person to who is authorized to have access to the contents stored in the storage furniture. However, it is quite easy to lose the key, and the key may easily get in the wrong hands. This is not desired.

BRIEF SUMMARY OF NON-LIMITING EXEMPLARY EMBODIMENT(S) OF THE PRESENT DISCLOSURE

This summary is provided to introduce a selection of concepts in a simplified form that are further described below in the detailed description. This summary is not intended to identify key features of essential features of the claimed subject matter, nor is it intended to be used to limit the scope of the claimed subject matter. Furthermore, the claimed subject matter is not limited to implementations that solve any or all disadvantages noted in any part of this disclosure.

In view of the foregoing background, it is therefore an object of the non-limiting exemplary embodiment(s) to provide a restricted access locking system for storage furniture. The system comprises one or more processors and one or more computer-readable non-transitory memory coupled to one or more of the processors, the one or more computer-readable non-transitory memory including instructions operable when executed by one or more of the processors to sense, via a first sensor that is communicatively coupled to the processor, an input biometric security credential to generate a first signal based on whether the input biometric security credential maps with a key biometric security credential pre-configured and stored within the memory; and generate a second signal via the processor subsequent to the reception of the first signal by the processor for actuating at least one lock, mounted on one or more storage compartments of the storage furniture, to an open position, wherein the at least one lock is communicatively coupled to the processor.

In a non-limiting exemplary embodiment, the one or more computer-readable non-transitory memory further includes instructions operable when executed by one or more of the processors to detect, via a second sensor, the position of one or more storage compartments of the storage furniture as either open or closed; generating a third signal on signal, via the processor on sensing that one of more storage compartments of the storage furniture being in the open position for a pre-defined time period; and generating an audible notification, via an audible notification generation unit subsequent to the reception of the third signal by the alarm generation unit to prompt the user to close the one or more open storage compartments of the storage furniture.

In a non-limiting exemplary embodiment, the one or more computer-readable non-transitory memory further includes instructions operable when executed by one or more of the processors to detect, via a second sensor, if one or more storage compartments of the storage furniture is opened prior to the unlocking of the one or more locks; and generating and transmitting, via the processor, a distress signal to one or more smart devices associated with the system, thus alerting the user of an attempt for gaining an unauthorized access to one or more storage compartments of the storage furniture.

In a non-limiting exemplary embodiment, the first sensor is one of a fingerprint sensor, a retina scan sensor, and a voice recognition sensor.

In a non-limiting exemplary embodiment, the second sensor is a magnetic reed switch mounted on a body of the at least one lock, wherein the magnetic reed switch is configured to interact with a magnet positioned on a body of the storage compartment.

In a non-limiting exemplary embodiment, the at least one lock is a solenoid operated electromagnetic lock including a reciprocating locking element, wherein the reciprocating locking element is configured to interact with a latching element having a configuration complementary to that of the reciprocating locking element of the at least one lock.

In a non-limiting exemplary embodiment, the processor is a network enabled processor and configured to use the UART communication protocol.

Another aspect envisaged in the present disclosure is a method for providing restricted access to one or more storage compartments of storage furniture. The method comprises sensing an input biometric security credential to generate a first signal based on whether the input biometric security credential maps with a key biometric security credential; and generating a second signal subsequent to the reception of the first signal by a processor for actuating at least one lock, mounted on one or more storage compartments of the storage furniture, to an open position, wherein the at least one lock is communicatively coupled to the processor.

In a non-limiting exemplary embodiment, the method further comprises detecting the position of one or more storage compartments of the storage furniture as either open or closed; generating a third signal on sensing that one of more storage compartments of the storage furniture are in the open position for a pre-defined time period; and generating an audible notification subsequent to the reception of the third signal to prompt the user to close the one or more open storage compartments of the storage furniture.

In a non-limiting exemplary embodiment, the method further comprising detecting if one or more storage compartments of the storage furniture is opened prior to the unlocking of the one or more locks; and generating and transmitting a distress signal to one or more smart devices associated with the system, thus alerting the user of an attempt for gaining an unauthorized access to one or more storage compartments of the storage furniture.

These and other features and advantages of the present subject matter will become more readily apparent from the attached drawings and the detailed description of the preferred embodiments, which follow.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

In the present specification the word "comprise", or variations thereof, such as "comprises" or "comprising", imply the inclusion of a stated element, integer or step, or group of elements, integers or steps, but not the exclusion of any other element, integer or step, or group of elements, integers or steps.

Further, the use of the expression "at least" or "at least one" suggests the use of one or more elements or ingredients or quantities, as the use can be in the embodiment of the present subject matter to achieve one or more of the desired objects or results.

Different characteristics and beneficial particulars are unfolded fully with reference to the embodiments/aspects which are exemplified in the accompanying drawing and detailed in the preceding description. Descriptions of techniques, methods, components, and equipment that a person skilled in the art is well aware of or those form common general knowledge in the field pertaining to the present subject matter is not described and/or introduced for the purpose of focusing on the present subject matter and not to obscure the present subject matter and advantageous features thereof. At the same time the present subject matter and its features that are explained herein in the detailed description and the specific examples, are given by way of illustration only, and not by way of limitation. It is to be understood that a person skilled in the art may and can think of various alternative substitutions, modifications, additions, and/or rearrangements which are considered to be within the spirit and/or scope of the underlying inventive concept.

First Embodiment

Figure 1:
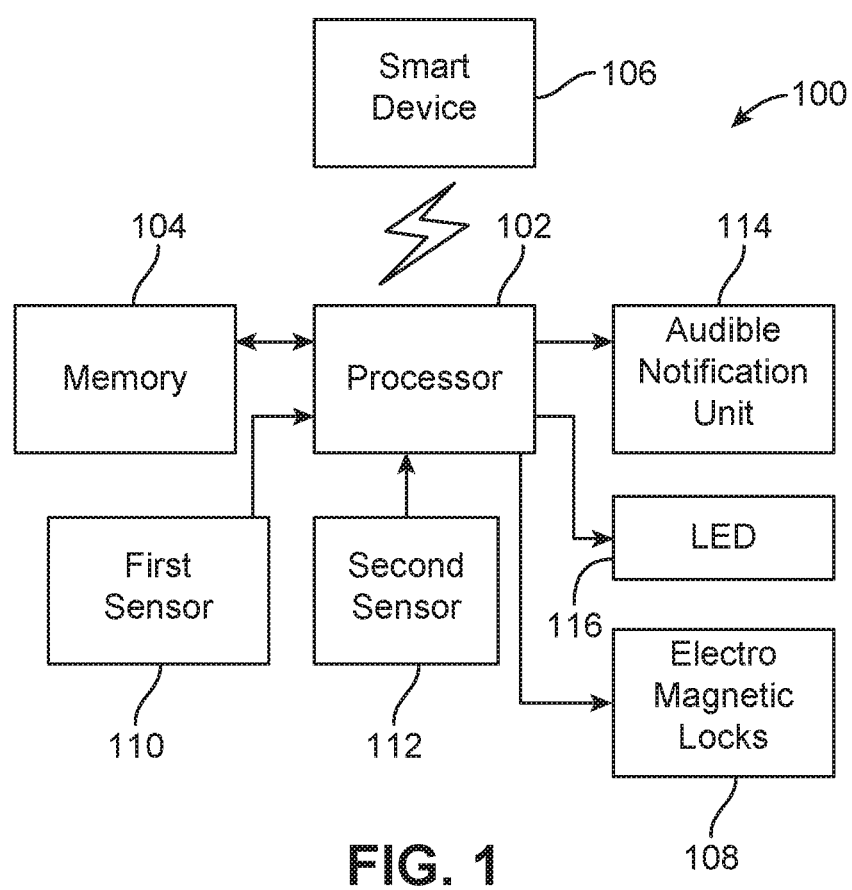
FIG. 1 illustrates a schematic block diagram of a system for providing restricted access to one or more storage compartments of storage furniture such as closets, file or book cabinets, kitchen cabinets, and the like, in accordance with one embodiment of the present invention.

FIG. 1 illustrates a schematic block diagram of a system for providing restricted access 100 (hereinafter referred to as system 100) to one or more storage compartments of storage furniture such as closets, file or book cabinets, kitchen cabinets, and the like. The system 100 comprises one or more processors 102 and one or more computer-readable non-transitory memory 104 coupled to one or more of the processors 102. The one or more computer-readable non-transitory memory 104 including instructions operable when executed the associated with the operation of the system 100. In accordance with one embodiment of the present disclosure, the system 100 includes one or more processors 102 (also referred to as central processing units, or CPUs) that may be coupled to storage devices including a primary storage (typically a random access memory, or RAM), the memory 104 (typically a read-only memory, or ROM). The processor 102 may be of various types including microcontrollers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors. As is well known in the art, the memory 104 acts to transfer data and instructions uni-directionally to the processor 102 typically may be used to transfer data and instructions in a bi-directional manner as well. The primary storage devices discussed previously may include any suitable computer-readable media such as those described above. In one preferred embodiment, the processor 102 is a network enabled microcontroller and capable of using various communication protocols such as Wi-fi, Bluetooth, and the like.

Referring back to FIG. 1, the system 100 is configured to interact with a smart device 106. The smart device 106 may be any smart device associated with a user or the person authorized to gain restricted access to the storage compartment on which the system 100 is installed. In one embodiment, the smart device 106 may be at least one of a smartphone, a tablet, a computer, a laptop, and the like. In one embodiment, each of these devices may be configured to include a user interface specific to interact with the system 100. As shown in FIG. 1, the smart device 106 is in wireless communication with the system 100, wherein the wireless communication between the system 100 and the smart device 106 is facilitated via the processor 102, wherein the processor 102 is a network enabled microcontroller. In one embodiment, the processor 102 is configured to communicate with the smart device 106 using the UART communication protocol. Advantageous aspects of using the UART communication protocol include cost effectiveness along with flexibility to interface the system 100 with an array of smart devices.

The system 100 further comprises a plurality of locks 108. In accordance with an embodiment of the present disclosure, the plurality of locks 108 are solenoid operated electromagnetic locks. The locks 108 are mounted on the bodies of the storage compartments and the storage furniture to which restricted access is to be provided. The plurality of locks 108 are communicatively coupled to the processor 102. The processor 102 is configured to generate the actuation signals for the locks 108 for facilitating the opening and closing operations of the locks 108 to facilitate the locking and unlocking of the storage compartments for which the provision of restricted is desired.

The system 100 further comprises a first sensor 110. In accordance with an embodiment of the present disclosure, the first sensor 110 may be a sensor configured to sense a biometric security credential for facilitating the actuation of the locks 108 based on whether the input biometric security credential maps with a key biometric security credential that is pre-configured to the system 100 using the user interface of the smart device 106 and the first sensor 110. More specifically, the first sensor 110 is communicatively coupled to the processor 102. The information regarding the input and key biometric security credentials is sensed by the first sensor 110 and the processed by the processor 102, which is then communicatively coupled to the smart device 106. The user can use the smart device 106 to communicate with the processor 102 to initiate the process of recording and configuring an initial first input biometric security credential as the key biometric security credential. The user interface of the smart device 106 may be in the form of an application or a website. The authorized user may be provided with an identification user name and password to access the user interface for establishing communication with the hardware components of the system 100.

Once the key biometric security credential is configured for the system 100, the user can then use the first sensor 110 to facilitate the locking and unlocking of the locks 108 that are mounted on the storage compartments and storage furniture to which the provision of restricted access is desired. More specifically, the first sensor 110 is configured to sense an input biometric security credential to generate a first signal based on whether the input biometric security credential maps with the key biometric security credential pre-configured and stored within the memory 104. If the input biometric security credential matches with the key biometric security credential, then the processor 102 generates a second signal subsequent to the reception of the first signal for actuating at least one lock 108, mounted on one or more storage compartments of the storage furniture, to an open position. In accordance with one exemplary embodiment, the first sensor 110 is a fingerprint sensor. However, the first sensor 110 is not limited to being a fingerprint sensor, and the first sensor 110 may be any other sensor that can sense and record any biometric security credential other than the fingerprint, e.g., a retina scan sensor or a voice recognition sensor.

An advantageous aspect of the system 100 of the present disclosure is that the system allows the locking and unlocking of the locks 108 using biometric security credential instead of the conventional methods such as metallic keys or locks with numerical key combinations. The configuration of the biometric security credential ensures that only the authorized person can obtain access to the locked storage compartment instead of any other unauthorized person who may have a key or a numerical key combination that was obtained unethically.

Another advantageous aspect of the system 100 is that the system 100 can alert an authorized user of an unauthorized attempt at unlocking or gaining access to the locked storage compartment forcefully. To this end, the system 100 includes a second sensor 112 that is communicatively coupled to the processor 102. In one embodiment, the second sensor 112 is a magnetic reed switch disposed on a body of the lock 108. The second sensor or the magnetic reed switch 112, in accordance with an embodiment of the present disclosure, is configured to interact with a magnet that is disposed on the body of the storage compartment or the storage furniture. The interaction of the second sensor or the magnetic reed switch 112 with the magnet alerts the processor 102 of the position or state of the storage compartment as to whether the storage compartment is open or closed.

The second sensor 112 is configured to detect if one or more storage compartments of the storage furniture is opened prior to the unlocking of the one or more locks 108. More specifically, when the magnetic reed switch or the second sensor 112 may normally be in its closed position under the effect of the magnetic field of the magnet mounted on the body of the storage compartment when the storage compartment is in its closed position. However, if a forceful attempt is made to gain unauthorized access to the storage compartment, the lock 108 along with the second sensor 112 may be pushed away from the magnet, causing the magnetic reed switch to open and the corresponding signal is sent to the processor 102. More specifically, the second sensor 112 prompts the processor 102 to generate and transmit a distress signal to one or more smart devices 106 associated with the system 100, thus alerting the user of an attempt for gaining an unauthorized access to one or more storage compartments of the storage furniture.

In yet another embodiment, the processor 102 may be further configured to generate a loud alarm sound via an audible notification unit 114 and flash a bright light via an LED 116 subsequent to the generation of the distress signal. It is to be noted that the audible notification unit 114 and the LED 116 are communicatively coupled to the processor 102 and receive appropriate operational signals from the processor 102 subsequent to the generation of the distress signal. The loud alarm and the flashing of the bright light may cause the intruder attempting to gain unauthorized access to the storage compartment to fluster and immediately cease their attempts.

Another advantageous feature of the system 100 is the reminder feature, wherein the user is reminded to close the storage compartment if the storage compartment is kept open for a pre-determined time period. When the storage compartment is opened, the same is sensed by the second sensor 112. If the opening of the storage compartment was a legitimate opening subsequent to the positive mapping of the input biometric security credential with the key biometric security credential, the processor 102 does not generate the distress signal or notification. However, subsequent to such an authorized opening, if the user forgets to close the storage compartment for a pre-determined time period, the second sensor or the magnetic reed switch 112 remains in the open position. In one embodiment, the processor 102 may be configured to prompt the audible notification unit 114 to produce an audible notification to remind the user to close the storage compartment on sensing that the second sensor or the magnetic reed switch 112 has remained in an open position for the pre-determined time period. In one example, the pre-determined time period may be 5 minutes.

The second sensor 112 detects the position of one or more storage compartments of the storage furniture as either open or closed. More specifically, the position of the magnetic reed switch is an indicator for the processor 102 whether the storage compartment is in its open or closed position. On sensing that the magnetic reed switch is in its open state for a pre-determined period of time, the processor 102 generates a third signal. The third signal is a trigger signal that is supplied to the audible notification generation unit 114. Subsequent to the reception of the third signal, the audible notification generation unit 114 is configured to generate an audible notification to prompt the user to close the one or more open storage compartments of the storage furniture. In addition to the audible notification, the user may also be prompted via the operation of the LED 116, in accordance with one exemplary embodiment.

Figure 2A:
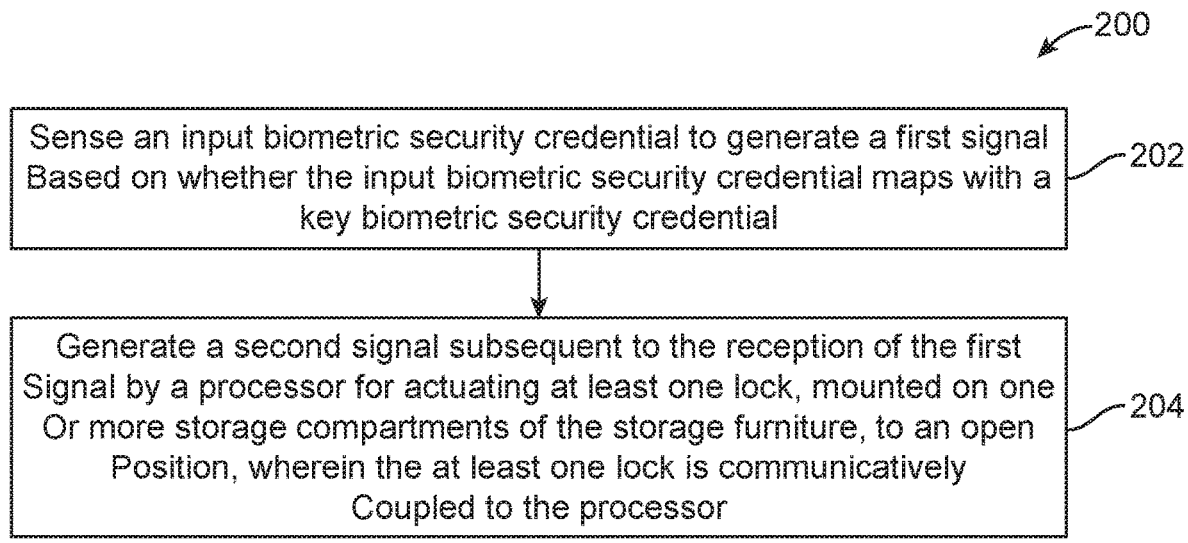
FIG. 2A illustrates a flow diagram depicting a method for providing a restricted access to one or more storage compartments, in accordance with an embodiment of the present disclosure.

FIG. 2A illustrates a flow diagram depicting a method 200 for providing a restricted access to one or more storage compartments, in accordance with an embodiment of the present disclosure. One implementation of the method 200 is preferably carried out in view of the system 100 described with reference to FIG. 1. It is to be noted that the method 200 can also be carried out in other desired environments. More specifically, the method 200 can be implemented in any suitable hardware, software, firmware, or combination thereof.

At block 202, the method 200 includes the step of sensing an input biometric security credential to generate a first signal based on whether the input biometric security credential maps with a key biometric security credential. In one embodiment, this step is facilitated by the first sensor 110. As mentioned previously, the first sensor 110 may be one of a fingerprint sensor, a retina scan sensor, and a voice recognition sensor. As such, the biometric security credential may be one of a fingerprint, a retina scan, and a voice sample, in accordance with some other examples of the present disclosure.

At block 204, the method includes the step of generating a second signal subsequent to the reception of the first signal for actuating at least one lock, mounted on one or more storage compartments of the storage furniture, to an open position. In one embodiment, the generation of the second signal is facilitated by the processor 102. The at least one lock is the lock that requires unlocking in order to gain an authorized access to the storage compartment on which the lock is mounted. In one embodiment, the lock is a solenoid operated electromagnetic lock 108 that is communicatively coupled to the processor 102.

Figure 2B:
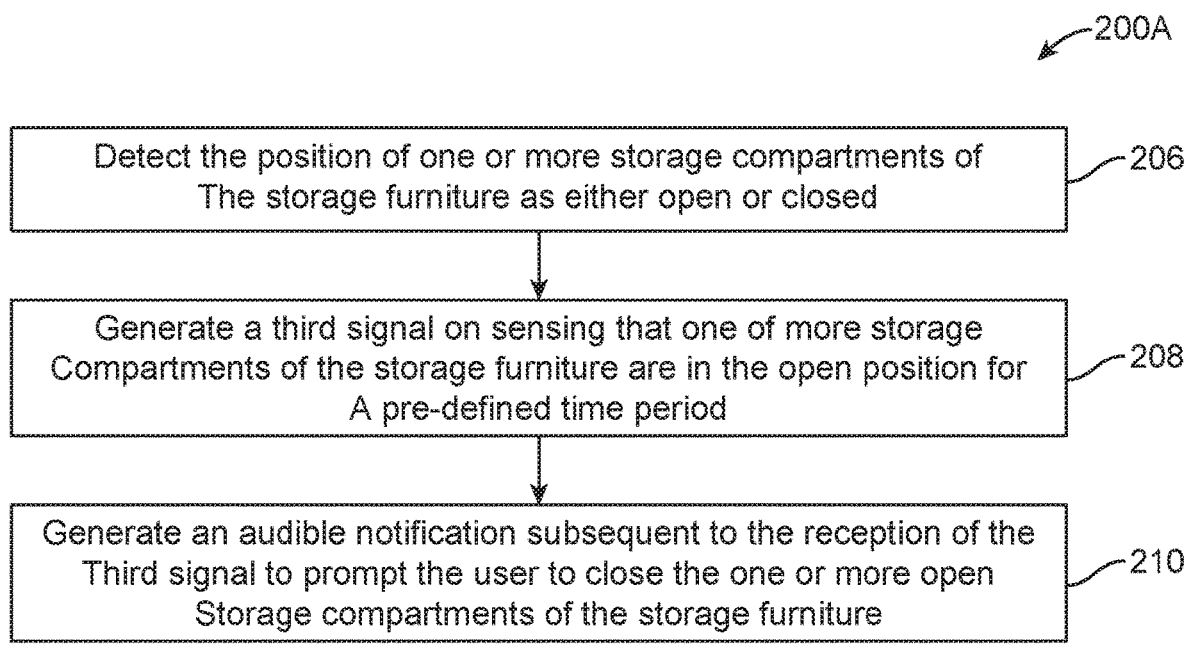
FIG. 2B illustrates a flow diagram depicting a reminder feature of the method to prompt a user to close the storage compartment after a pre-determined time period, in accordance with an embodiment of the present disclosure.

FIG. 2B illustrates a flow diagram depicting a reminder feature 200A of the method 200 to prompt a user to close the storage compartment after a pre-determined time period, in accordance with an embodiment of the present disclosure. One implementation of the method 200A is preferably carried out in view of the system 100 described with reference to FIG. 1. It is to be noted that the method 200A can also be carried out in other desired environments. More specifically, the method 200A can be implemented in any suitable hardware, software, firmware, or combination thereof.

At block 204, the reminder feature 200A includes the step of detecting the position of one or more storage compartments of the storage furniture as either open or closed. In one embodiment, this step is performed by the second sensor 112 of the system 100. As mentioned previously, the second sensor 112 can be a magswitch sensor or a magnetic reed switch, which operates in conjunction with a magnet.

At block 206, the reminder feature 200A includes the step of generating a third signal on sensing that one of more storage compartments of the storage furniture are in the open position for a pre-defined time period. In one embodiment, the generation of the third signal is facilitated by the processor 102. More specifically, the processor 102 may be configured to sense and keep track of the time period for which the second sensor or the magnetic reed switch 112 remains open.

At block 208, the reminder feature 200A includes the step of generating an audible notification subsequent to the reception of the third signal to prompt the user to close the one or more open storage compartments of the storage furniture. In accordance with one embodiment, the audible notification is generated by the audible notification generation unit 114. More specifically, the third signal is generated by the processor 102 if the time period that the magnetic reed switch 112 remains open exceeds a pre-determined time period, e.g., 5 minutes. The audible notification prompts the user to close the storage compartment if at all the user has inadvertently forgotten to close the storage compartment to which the provision of restricted access is desired.

Figure 2C:
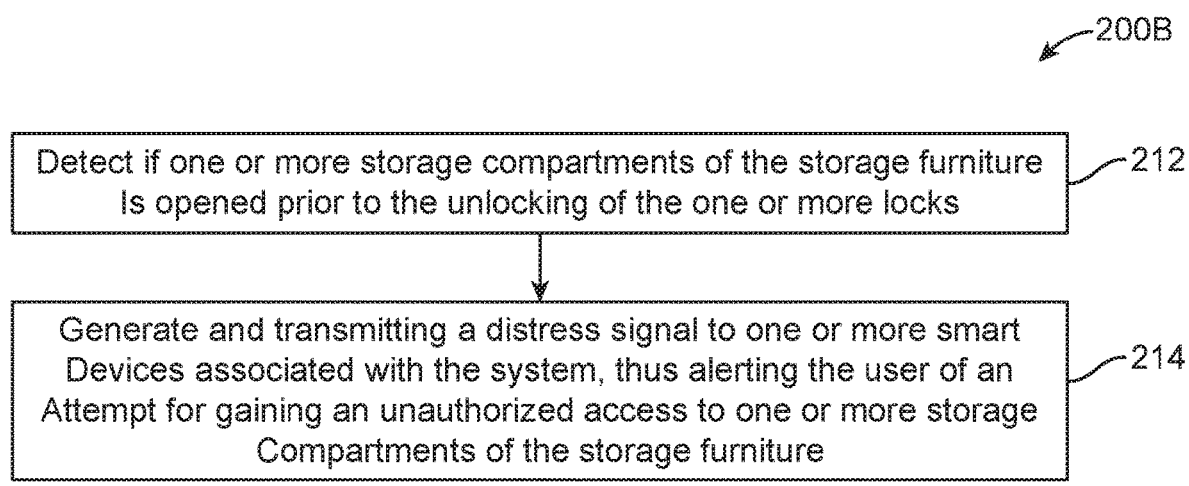
FIG. 2C illustrates a flow diagram depicting a distress signal feature of the method to notify a user of an attempt to gain unauthorized access to a locked storage compartment, in accordance with an embodiment of the present disclosure.

FIG. 2C illustrates a flow diagram depicting a distress signal feature 200B of the method 200 to notify a user of an attempt to gain unauthorized access to a locked storage compartment, in accordance with an embodiment of the present disclosure. One implementation of the method 200B is preferably carried out in view of the system 100 described with reference to FIG. 1. It is to be noted that the method 200B can also be carried out in other desired environments. More specifically, the method 200B can be implemented in any suitable hardware, software, firmware, or combination thereof.

At block 212, the distress signal feature 200B includes the step of detecting if one or more storage compartments of the storage furniture is opened prior to the unlocking of the one or more locks. In one embodiment, this step is performed by second sensor 112. As mentioned previously, the second sensor 112 may be a magnetic reed switch.

At block 214, the distress signal feature 200B includes the step of generating and transmitting a distress signal to one or more smart devices associated with the user, thus alerting the user of an attempt for gaining an unauthorized access to one or more storage compartments of the storage furniture. In one embodiment, the processor 102 is configured to generate the distress signal when the second sensor 112 switches from closed state to open state without any prompt from the processor 102. Such a shift of the second sensor from the closed state to open state indicates that the distance between a magnet and the second sensor or the magnetic reed switch 112 has increased, which may be caused by a forceful attempt to gain an unauthorized access to the storage compartment.

Figure 3:
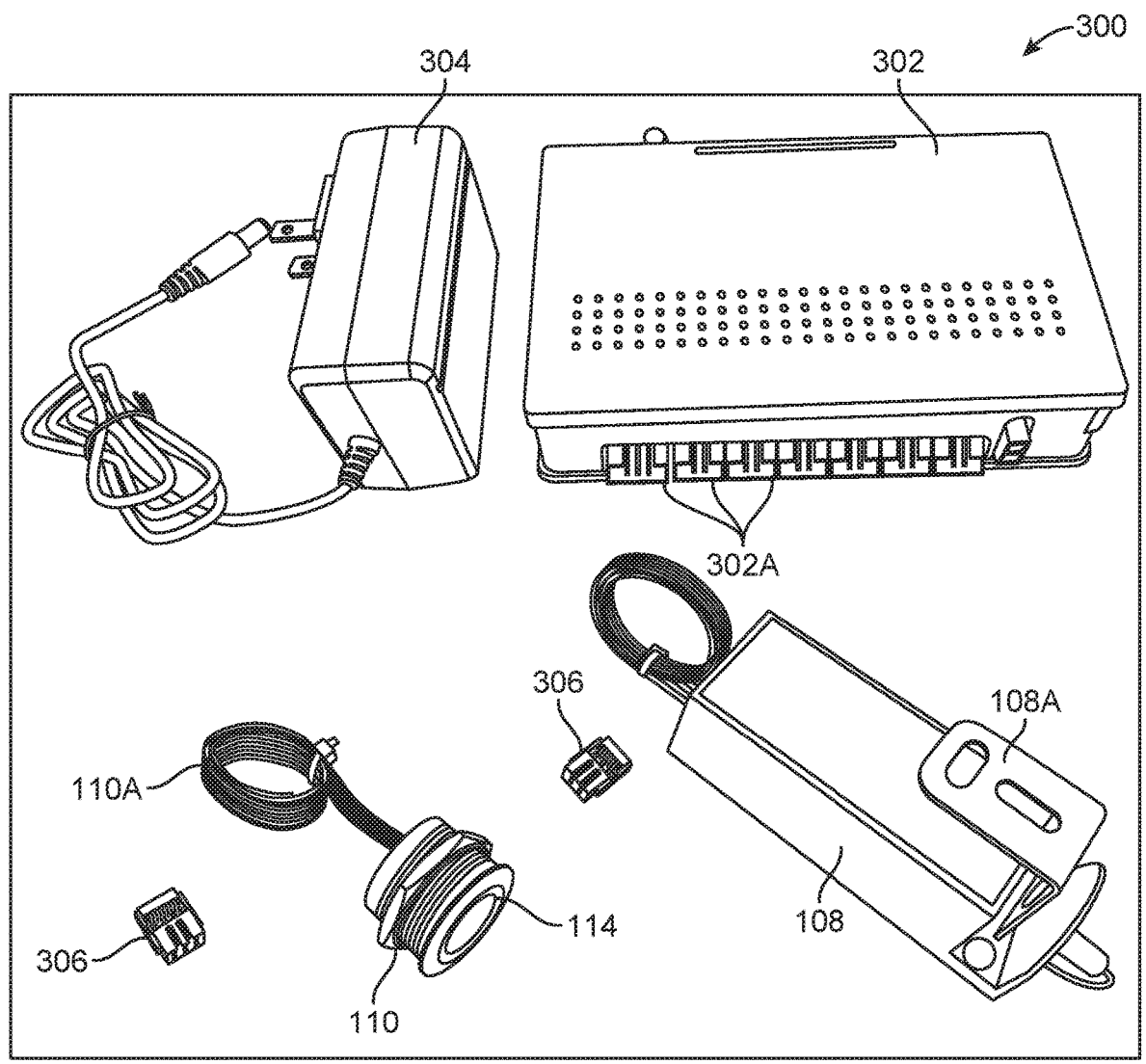
FIG. 3 illustrates a perspective view of a kit for providing restricted access to one or more storage compartments, in accordance with an embodiment of the present disclosure.

FIG. 3 illustrates a perspective view of a kit 300 for providing restricted access to one or more storage compartments, in accordance with an embodiment of the present disclosure. The kit 300 comprises a control unit 302. The control unit 302 is the most important component of the kit 300 as it includes a printed circuit board configured for implementation of the system 100 illustrated with reference to FIG. 1. The kit 300 further comprises a power adaptor 304 for providing the power to the control unit 300 directly from the mains. In another embodiment, the kit 300 may be a battery operated kit.

The kit 300 further comprises the first sensor 110, which in accordance with the instant embodiment is a fingerprint sensor. The first sensor 110 has a 6 channel ribbon cable 110A that is configured to be terminated into a connector 306. The connector 306 is configured to fit into a plurality of ports 302A configured to the control unit 302 for establishing communicative coupling between the processor of the control unit and the first sensor. In one embodiment, the first sensor 112 includes the LED 116, wherein the LED 116 may be configured to flash a red light when there is a mismatch between an input security credential and the key security credential, and a green light when there is a mismatch between an input security credential and the key security credential. The green light acts as an indicator that the storage compartments have been unlocked and can be opened safely.

The kit 300 further comprises the lock 108. The lock 108, in accordance an embodiment of the present disclosure, is a solenoid operated electromagnetic lock. The lock 108 further includes a latch 108A. The lock 108 and the latch 108A may be mounted respectively and interchangeably on the bodies of the storage compartments and storage furniture to facilitate the locking of the storage compartment to the body of the storage furniture. The lock 108 has a 4 channel ribbon cable that terminates into the connector 306 to connect with the ports 302A of the control unit 302.

Figure 4:
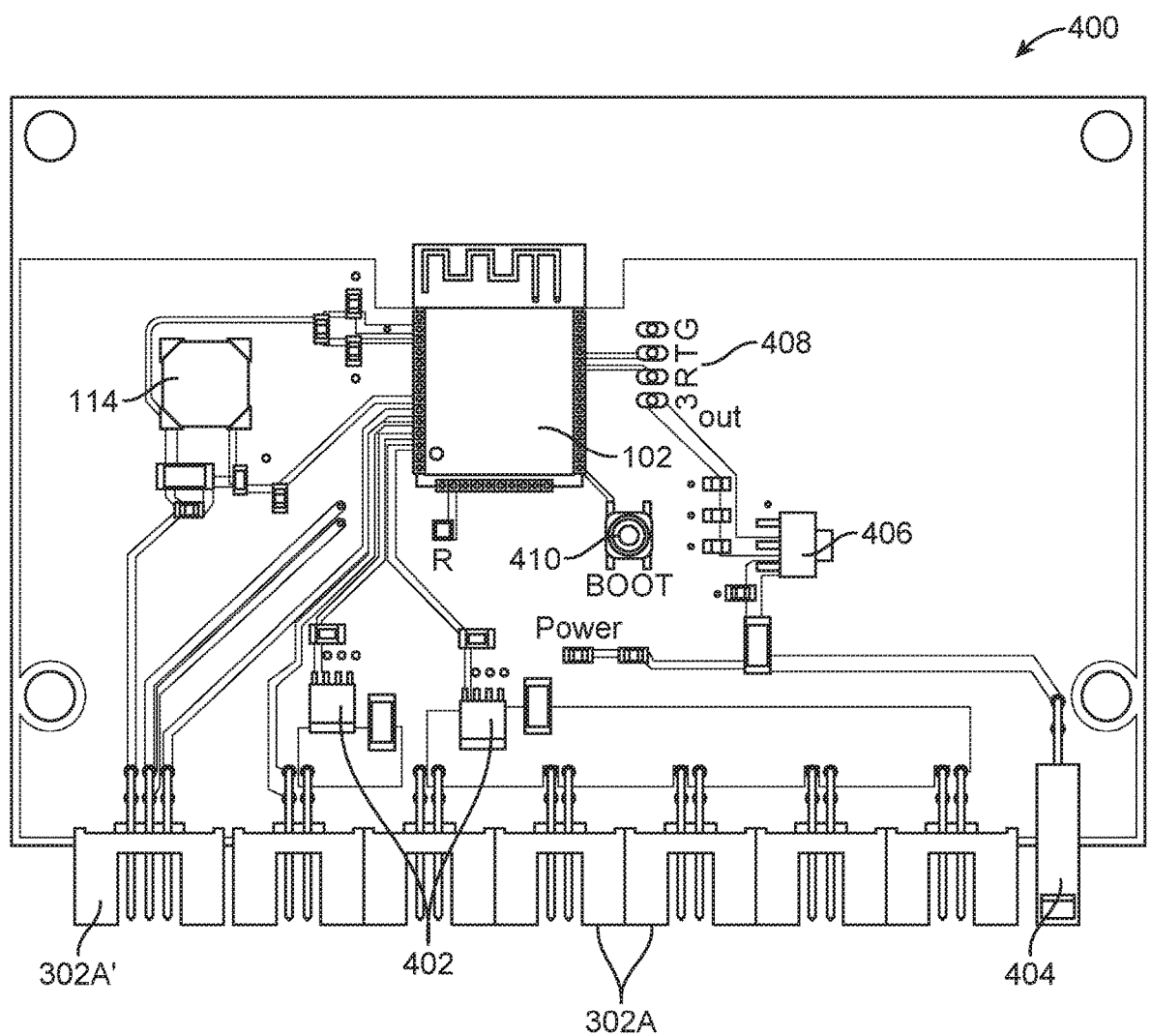
FIG. 4 illustrates a top view of a Printed Circuit Board used in the system, in accordance with an embodiment of the present disclosure.

FIG. 4 illustrates a top view of a Printed Circuit Board 400 (herein after referred to as PCB 400) used in the system 100, in accordance with an embodiment of the present disclosure. The PCB 400 comprises the processor 102. As mentioned previously, the processor 102 is a network enabled processor. In one embodiment, the processor 102 is a network enabled microcontroller. The PCB 400 further comprises the audible notification generation unit 114 that is communicatively coupled to the processor 102. The PCB 400 further comprises the plurality of connection ports 302A. One port 302A', in accordance with an embodiment of the present disclosure, is a 6 pin connection port, whereas the remaining ports 304A are 4 pin connection ports. The 6 pin connection port 302A' is configured to connect with the first sensor or the fingerprint sensor 110, whereas the 4 pin connection ports 304A are configured to connect with the plurality of locks 108. All of the connection ports are communicatively connected to the processor 102 to allow the processor 102 to control the hardware components connected to the ports.

The PCB 400 further comprises switches 402. The switches 402 are MOSFET switches, in accordance with one embodiment and are operatively coupled to the ports 302A' and 302A. The switches 402 are coupled to the processor 102 and the connection ports 302A' and 302A for controlling the operation of the hardware components connected to the connection ports 302A' and 302A.

The PCB 400 further comprises input power pin receiver 404 and a voltage regulator 406. The input power pin receiver 404 is configured to receive the output pin of the power adaptor 304 of the kit 300 for providing the power required for the operation of the PCB 400. The voltage regulator 406 is configured to regulate the input power to facilitate optimal operation of the PCB 400. The PCB 400 further comprises ports 408 and boot switch 410 for facilitating the loading of the initial software loading, which may include the different firmware processes required for the operation of the system 100.

Figure 5:
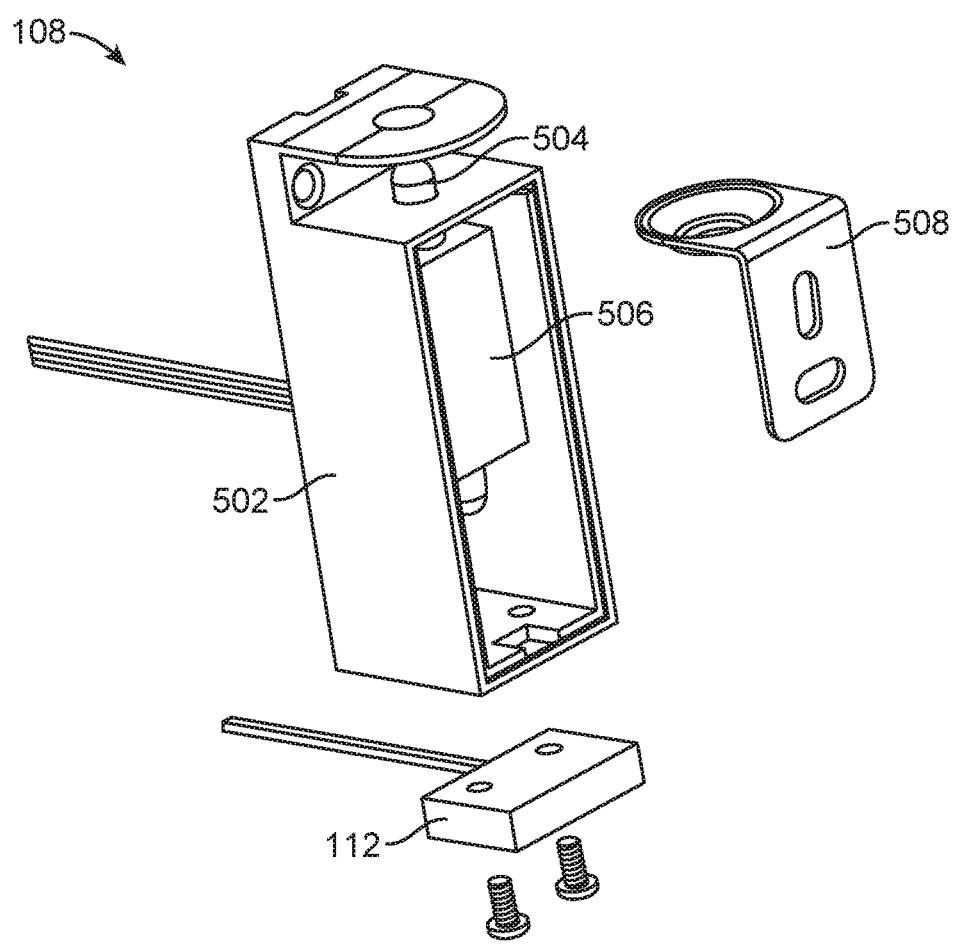
FIG. 5 illustrates an exploded view of a lock used in the kit, in accordance with an embodiment of the present disclosure.

FIG. 5 illustrates an exploded view of a lock 108 used in the kit 300, in accordance with an embodiment of the present disclosure. The lock 108 includes a housing 502 and a locking element 504 disposed with the housing 502. The locking element 504 may be a coupled to a solenoid 506. The locking element 504 is configured to interact with a latch 508 to facilitate the locking of the storage compartment. In one embodiment, the lock 108 may be attached to the body of the storage furniture, and the latch 508 is attached to the storage compartment whose locking is desired. The lock 108 has the second sensor or the magnetic reed switch 112 attached on the housing 502. The magnetic reed switch may be configured to interact with a magnet that may be placed on the storage compartment for sensing the opening and closing of the storage compartment via the second sensor or the magnetic reed switch 112.

Figure 6:
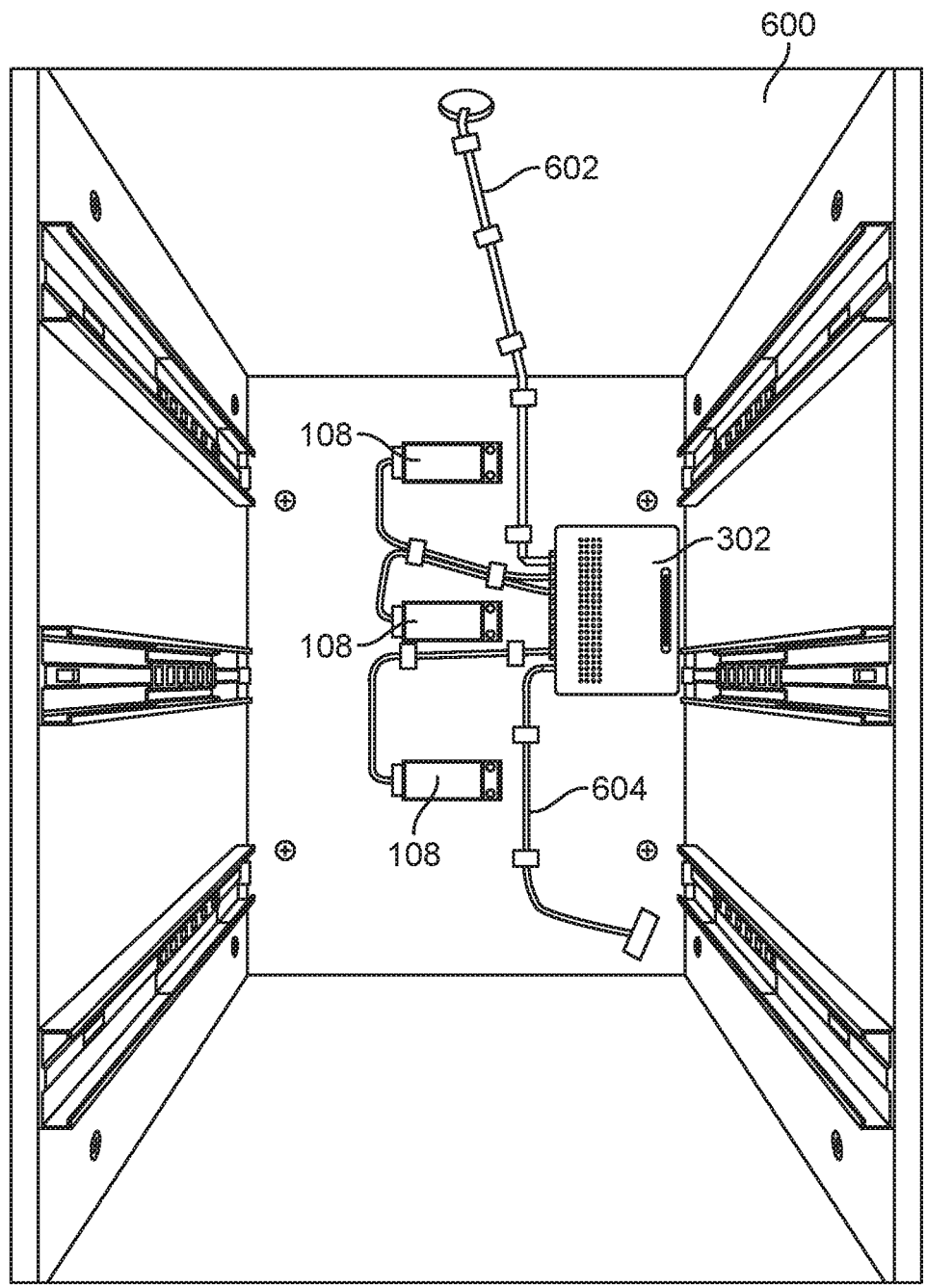
FIG. 6 and FIG. 7 illustrate perspective views of the kit being installed on a body of storage furniture, in accordance with one embodiment of the present disclosure.
Figure 7:
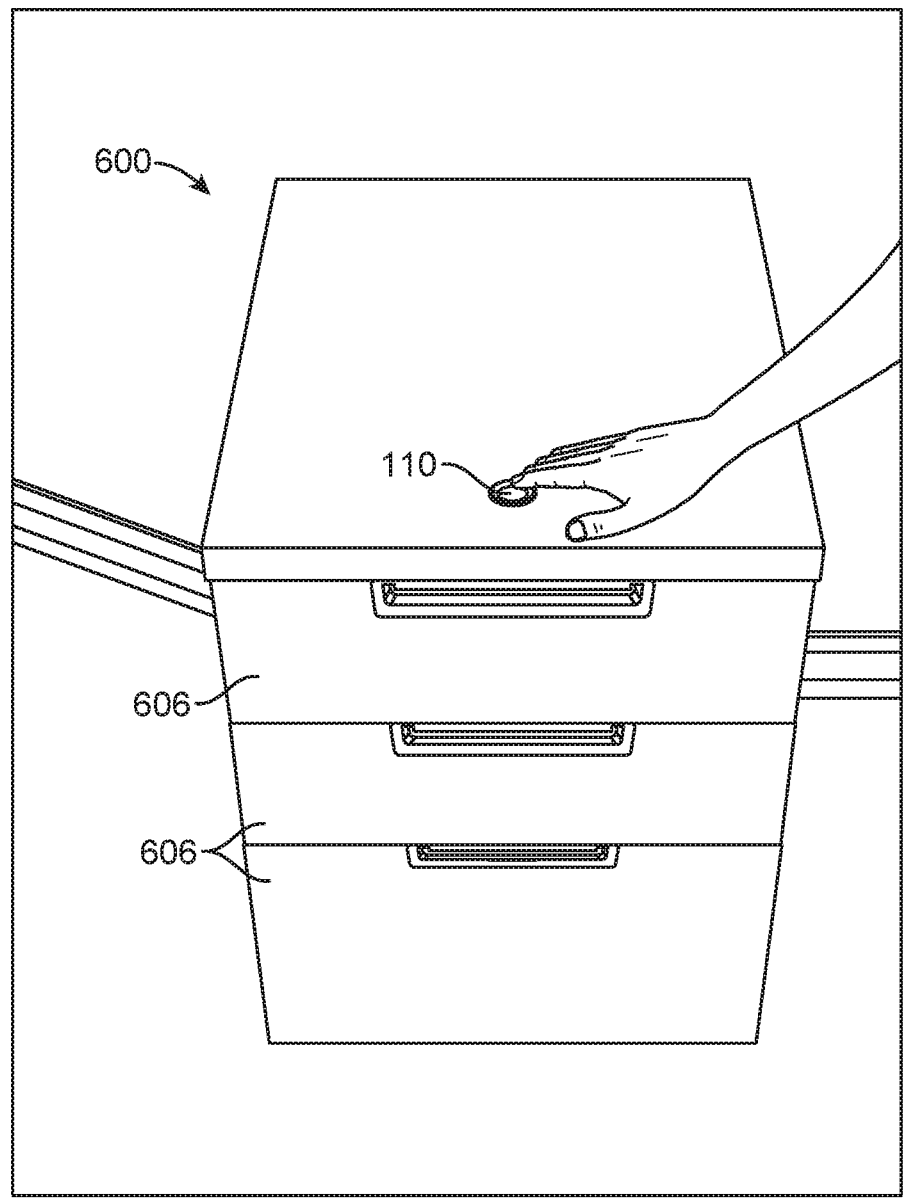

FIG. 6 and FIG. 7 illustrate perspective views of the kit 300 being installed on a body of storage furniture, in accordance with one embodiment of the present disclosure. In the present embodiment, the storage furniture is a drawer cabinet 600. The drawer cabinet 600 has the control unit 302 and locks 108 installed in the interior of the body of the drawer cabinet 600. The cable 602 extends from the control unit 302 to the operative top end of the drawer cabinet 600 and connects to the first sensor or the fingerprint sensor 110. The cable 604 extends from the control unit 302 and is the cable of the power adaptor 304.

It is to be noted that the latches corresponding to the locks 108 may be disposed on the bodies of the drawers 606 of the drawer cabinet 600 (not illustrated in FIG. 7). As the user touches the first sensor 110, the lock 108 is actuated to an open position by the control unit 302 after which a green light may be flashed via the LED 116 integrated within the first sensor 110 to prompt the user that the drawer 606 is unlocked and can be opened.

Second Embodiment

Figure 8:
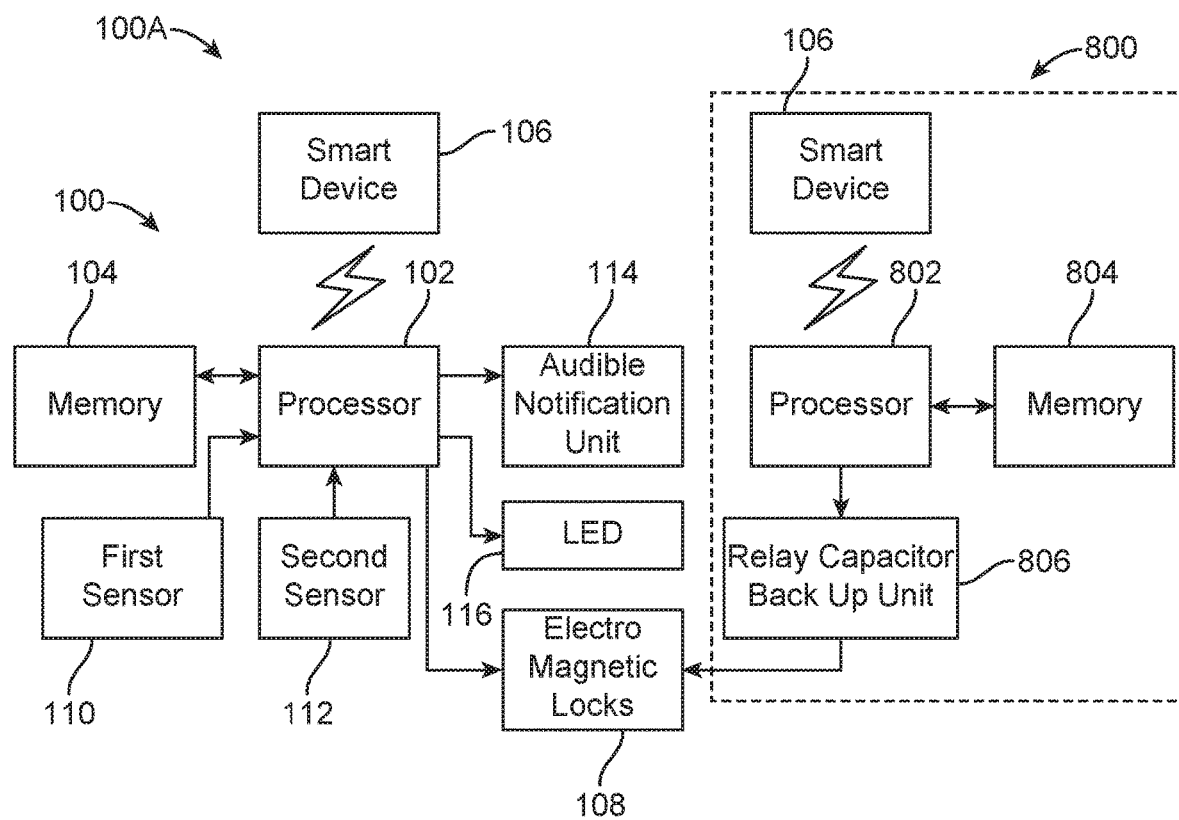
FIG. 8 illustrates a block diagram of another embodiment of the system for providing restricted access, in accordance with another embodiment of the present disclosure.

FIG. 8 illustrates a block diagram of another embodiment of the system for providing restricted access to 100A (hereinafter referred to as system 100A), in accordance with another embodiment of the present disclosure. The system 100A includes two sub-systems. The first sub-system 100 is the same identical system 100 described in the present disclosure with reference to FIG. 1. As such, the description of the first sub-system 100 is not repeated herein for the sake of brevity of the present disclosure.

The second sub-system 800 is a failsafe system that is coupled to the first sub-system 100. The failsafe system 800 comprises one or more processors 802 and one or more computer-readable non-transitory memory 804 coupled to one or more of the processors 802. The one or more computer-readable non-transitory memory 804 including instructions operable when executed the associated with the operation of the system 800. The processor 802, which like processor 102 is a network enabled processor that is configured to utilize the UART communication protocol. The processor 802 is configured to be communicatively coupled to the smart device 106. The smart device 106 may be one of a smartphone, a tablet, a computer, and a laptop.

The failsafe system 800 further comprises a relay capacitor backup unit 806. The relay backup capacitor unit 806 is communicatively coupled to the processor 802 and the locks 108. The failsafe system 800 is configured to become active if any one of the hardware or software malfunction occurs in the system 100. When such a malfunction occurs, a distress notification may be generated and sent via the processor 102 to the smart device 106 of the user. The user can then use their smart device 106 to manually activate the failsafe system 800 via an option provided on the user interface of the of the system 100A on the smart device 106.

Once the failsafe system 800 is activated, the processor 802 instructs the relay backup capacitor unit 806 to provide backup power to the locks 108 to facilitate unlocking of the solenoid operated electromagnetic locks 108. An advantageous aspect of this feature is that the user does not get locked out and can still easily access the storage compartment until the maintenance procedures are performed on the system 100A.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed is:

1. A restricted access locking system comprising:
   at least one item of storage furniture;
   one or more processors and one or more computer-readable non-transitory memory coupled to one or more of the processors, the one or more computer-readable non-transitory memory including instructions operable when executed by one or more of the processors to:
     sense, via a first sensor that is communicatively coupled to the processor, an input biometric security credential to generate a first signal based on whether the input biometric security credential maps with a key biometric security credential pre-configured and stored within the memory; and
     generate a second signal via the processor subsequent to the reception of the first signal by the processor for actuating at least one lock, mounted on one or more storage compartments of the storage furniture, to an open position, wherein the at least one lock is communicatively coupled to the processor; and
   a failsafe system, wherein the failsafe system comprises one or more secondary processors and one or more secondary computer-readable non-transitory memory coupled to one or more of the secondary processors, the one or more secondary computer-readable non-transitory memory including instructions operable when executed by one or more of the secondary processors to:
     receive an activation signal via the secondary processor of the failsafe system sent via a smart device associated with a user of the system, subsequent to a malfunction of at least one hardware component or software component of the system; and
     supply backup power to actuate at least one lock to an open position, by a relay capacitor back up unit that is communicatively coupled to the secondary processor of the failsafe system.

2. The system according to claim 1, wherein the one or more computer-readable non-transitory memory further includes instructions operable when executed by one or more of the processors to:
   detect, via a second sensor, the position of one or more storage compartments of the storage furniture as either open or closed; generating a third signal on signal, via the processor on sensing that one of more storage compartments of the storage furniture being in the open position for a pre-defined time period; and
   generating an audible notification, via an audible notification generation unit subsequent to the reception of the third signal by the audible notification generation unit to prompt the user to close the one or more open storage compartments of the storage furniture.

3. The system according to claim 1, wherein the one or more computer-readable non-transitory memory further includes instructions operable when executed by one or more of the processors to:
   detect, via a second sensor, if one or more storage compartments of the storage furniture is opened prior to the unlocking of the one or more locks; and
   generating and transmitting, via the processor, a distress signal to one or more smart devices associated with the system, thus alerting the user of an attempt for gaining an unauthorized access to one or more storage compartments of the storage furniture.

4. The system according to claim 1, wherein the first sensor is one of a fingerprint sensor, a retina scan sensor, and a voice recognition sensor.

5. The system according to claim 1, wherein the one or more computer-readable non-transitory memory further includes instructions operable when executed by one or more of the processors to detect, via a second sensor, if one or more storage compartments of the storage furniture is opened prior to the unlocking of the one or more locks; and generating and transmitting, via the processor, a distress signal to one or more smart devices associated with the system, thus alerting the user of an attempt for gaining an unauthorized access to one or more storage compartments of the storage furniture:
   wherein the second sensor is a magnetic reed switch mounted on a body of the at least one lock, wherein the magnetic reed switch is configured to interact with a magnet positioned on a body of the storage compartment.

6. The system according to claim 1, wherein the at least one lock is a solenoid operated electromagnetic lock including a reciprocating locking element, wherein the reciprocating locking element is configured to interact with a latching element having a configuration complementary to that of the reciprocating locking element of the at least one lock.

7. The system according to claim 1, wherein the processor is a network enabled processor and configured to use a UART communication protocol.

8. A method for providing restricted access to one or more storage compartments of storage furniture, the method comprising:

sensing an input biometric security credential to generate a first signal based on whether the input biometric security credential maps with a key biometric security credential;

generating a second signal via a primary processor subsequent to the reception of the first signal for actuating at least one lock, mounted on one or more storage compartments of the storage furniture, to an open position;

receiving an activation signal on a secondary processor transmitted via a smart device associated with a user, subsequent to a malfunction of at least one hardware component or software component of the one or more storage compartments; and supplying backup power to actuate at least one lock to an open position, by a relay capacitor back up unit that is communicatively coupled to the secondary processor.

9. The method according to claim 8, further comprising:
detecting the position of one or more storage compartments of the storage furniture as either open or closed;
generating a third signal on sensing that one of more storage compartments of the storage furniture are in the open position for a predefined time period; and
generating an audible notification subsequent to the reception of the third signal to prompt the user to close the one or more open storage compartments of the storage furniture.

10. The method according to claim 8, further comprising:
detecting if one or more storage compartments of the storage furniture is opened prior to the unlocking of the one or more locks; and
generating and transmitting a distress signal to one or more smart devices, thus alerting the user of an attempt for gaining an unauthorized access to one or more storage compartments of the storage furniture.

11. The method according to claim 8, wherein the input biometric security credential is one of a fingerprint, a retina scan, and a voice recognition sample.

12. A kit for providing restricted access to one or more storage compartments of storage furniture, the kit comprising:
a power adaptor;
at least one lock configured for locking and unlocking the one or more storage compartments;
a control unit comprising: one or more processors and one or more computer-readable non-transitory memory coupled to one or more of the processors, the one or more computer-readable non-transitory memory including instructions operable when executed by one or more of the processors to:
sense, via a first sensor that is communicatively coupled to the processor, an input biometric security credential to generate a first signal based on whether the input biometric security credential maps with a key biometric security credential pre-configured and stored within the memory; and
generate a second signal via the processor subsequent to the reception of the first signal by the processor for actuating at least one lock, mounted on one or more storage compartments of the storage furniture, to an open position, wherein the at least one lock is communicatively coupled to the processor; and
a failsafe system, wherein the failsafe system comprises one or more secondary processors and one or more secondary computer-readable non-transitory memory coupled to one or more of the secondary processors, the one or more secondary computer-readable non-transitory memory including instructions operable when executed by one or more of the secondary processors to:
receive an activation signal via the secondary processor of the failsafe system sent via a smart device associated with a user of the system, subsequent to a malfunction of at least one hardware component or software component of the system; and
supply backup power to actuate at least one lock to an open position, by a relay capacitor back up unit that is communicatively coupled to the secondary processor of the failsafe system.

13. The kit according to claim 12, wherein the one or more computer-readable non-transitory memory further includes instructions operable when executed by one or more of the processors to:
detect, via a second sensor, the position of one or more storage compartments of the storage furniture as either open or closed;
generating a third signal on signal, via the processor on sensing that one of more storage compartments of the storage furniture being in the open position for a pre-defined time period; and
generating an audible notification, via an audible notification generation unit subsequent to the reception of the third signal by the audible notification generation unit to prompt the user to close the one or more open storage compartments of the storage furniture.

14. The kit according to claim 12, wherein the one or more computer-readable non-transitory memory further includes instructions operable when executed by one or more of the processors to:
detect, via a second sensor, if one or more storage compartments of the storage furniture is opened prior to the unlocking of the one or more locks; and
generating and transmitting, via the processor, a distress signal to one or more smart devices associated with the system, thus alerting the user of an attempt for gaining an unauthorized access to one or more storage compartments of the storage furniture.

15. The kit according to claim 12, wherein the first sensor is one of a fingerprint sensor, a retina scan sensor, and a voice recognition sensor.

16. The kit according to claim 12, wherein the one or more computer-readable non-transitory memory further includes instructions operable when executed by one or more of the processors to detect, via a second sensor, if one or more storage compartments of the storage furniture is opened prior to the unlocking of the one or more locks; and generating and transmitting, via the processor, a distress signal to one or more smart devices associated with the system, thus alerting the user of an attempt for gaining an unauthorized access to one or more storage compartments of the storage furniture:
wherein the second sensor is a magnetic reed switch mounted on a body of the at least one lock, wherein the magnetic reed switch is configured to interact with a magnet positioned on a body of the storage compartment.

17. The kit according to claim 12, wherein the at least one lock is a solenoid operated electromagnetic lock including a reciprocating locking element, wherein the reciprocating locking element is configured to interact with a latching element having a configuration complementary to that of the reciprocating locking element of the at least one lock.

18. The kit according to claim 12, wherein the processor is a network enabled processor and configured to use a UART communication protocol.

\* \* \* \* \*